(12) United States Patent
Igarashi

(10) Patent No.: US 10,986,676 B2
(45) Date of Patent: Apr. 20, 2021

(54) WIRELESS COMMUNICATION APPARATUS

(71) Applicant: FUJI XEROX CO., LTD., Tokyo (JP)

(72) Inventor: Osamu Igarashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 545 days.

(21) Appl. No.: 15/788,271

(22) Filed: Oct. 19, 2017

(65) Prior Publication Data

US 2018/0288812 A1 Oct. 4, 2018

(30) Foreign Application Priority Data

Apr. 4, 2017 (JP) ............................. JP2017-074294

(51) Int. Cl.
*H04W 4/02* (2018.01)
*H04W 76/11* (2018.01)
*H04M 1/72412* (2021.01)
*H04M 1/72454* (2021.01)

(52) U.S. Cl.
CPC ....... *H04W 76/11* (2018.02); *H04M 1/72412* (2021.01); *H04M 1/72454* (2021.01); *H04W 4/023* (2013.01); *H04M 2250/06* (2013.01)

(58) Field of Classification Search
CPC ... H04W 76/021; H04W 76/11; H04W 4/023; H04M 1/7253; H04M 1/72569; H04M 2250/06
See application file for complete search history.

(56) References Cited

U.S. PATENT DOCUMENTS

| | | | | |
|---|---|---|---|---|
| 10,057,956 B1* | 8/2018 | Hidaka | ................ | H05B 47/10 |
| 10,242,241 B1* | 3/2019 | Lotzer | ................ | G06K 9/22 |
| 10,521,991 B1* | 12/2019 | Cameron | ......... | G07C 9/00563 |
| 2008/0170776 A1* | 7/2008 | Albertson | ............. | G06F 21/36 |
| | | | | 382/154 |
| 2010/0108756 A1* | 5/2010 | Denis | .................. | G06K 19/07 |
| | | | | 235/375 |
| 2012/0214594 A1* | 8/2012 | Kirovski | ........... | G06K 9/00355 |
| | | | | 463/36 |
| 2013/0185368 A1* | 7/2013 | Nordstrom | ........... | H04W 4/023 |
| | | | | 709/206 |
| 2013/0204401 A1* | 8/2013 | Yamaguchi | ........... | G05B 11/01 |
| | | | | 700/17 |
| 2013/0295962 A1* | 11/2013 | Manroa | .............. | H04W 64/00 |
| | | | | 455/456.3 |
| 2014/0181956 A1* | 6/2014 | Ahn | ........................ | G06F 21/46 |
| | | | | 726/18 |

(Continued)

FOREIGN PATENT DOCUMENTS

JP 2014-131145 A 7/2014

*Primary Examiner* — Wutchung Chu
(74) *Attorney, Agent, or Firm* — Oliff PLC

(57) ABSTRACT

A wireless communication apparatus includes a transmission unit, a transmission controller, and an acceptance unit. The transmission unit transmits an identifier of a network to which the wireless communication apparatus belongs, without designating a destination. The transmission controller controls the transmission unit such that the identifier is presented in a different manner on a terminal that has received the identifier if movement of a person detected around the wireless communication apparatus is predetermined movement. The acceptance unit accepts a connection request using the identifier from the terminal.

17 Claims, 12 Drawing Sheets

(56) References Cited

U.S. PATENT DOCUMENTS

| | | | | |
|---|---|---|---|---|
| 2014/0185602 A1* | 7/2014 | Goto | .................... | H04W 8/005 |
| | | | | 370/338 |
| 2014/0236727 A1* | 8/2014 | Sukemitsu | ......... | G06Q 30/0261 |
| | | | | 705/14.58 |
| 2015/0145993 A1* | 5/2015 | Scalisi | ................. | H04M 11/025 |
| | | | | 348/143 |
| 2015/0187186 A1* | 7/2015 | Want | ................. | G06Q 30/0241 |
| | | | | 340/6.1 |
| 2015/0327060 A1* | 11/2015 | Gilson | ................. | H04W 76/11 |
| | | | | 726/7 |
| 2017/0055032 A1* | 2/2017 | Oshima | ............... | H04L 65/4084 |
| 2017/0135587 A1* | 5/2017 | Desroches | ......... | A61B 5/14551 |
| 2017/0156076 A1* | 6/2017 | Eom | .................... | H04W 24/04 |
| 2018/0095657 A1* | 4/2018 | Wang | ................. | G06F 3/04883 |
| 2018/0132181 A1* | 5/2018 | Shan | .................... | G06F 9/4843 |
| 2018/0184152 A1* | 6/2018 | Kirkpatrick | ...... | H04N 21/43635 |
| 2018/0233013 A1* | 8/2018 | Nishikado | ................ | H04N 7/18 |
| 2018/0359315 A1* | 12/2018 | Mujibiya | .............. | G06F 1/1684 |
| 2019/0014611 A1* | 1/2019 | Schenk | ................. | H04W 76/14 |
| 2019/0208270 A1* | 7/2019 | Bates | .............. | H04N 21/43615 |

* cited by examiner

FIG. 8

| PERSON'S MOVEMENT | FUNCTION | PRIORITY |
|---|---|---|
| RAISED HAND | AP | HIGH |
| WAIVING HAND | STA | LOW |

FIG. 15A
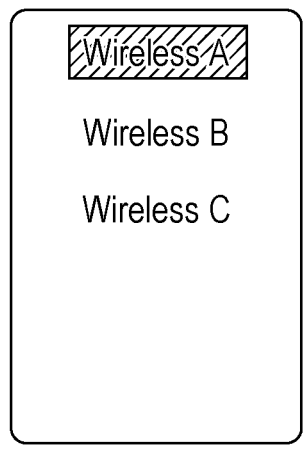
FIG. 15B-1
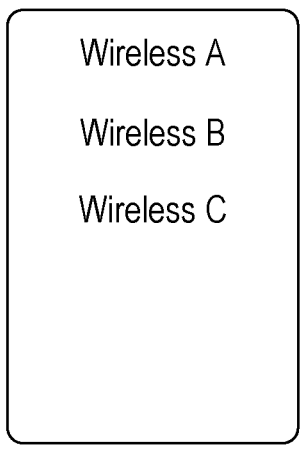
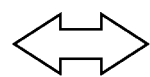
FIG. 15B-2
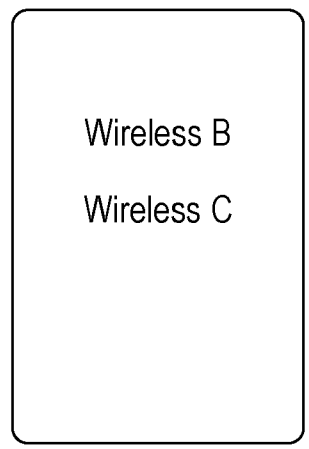
FIG. 15C
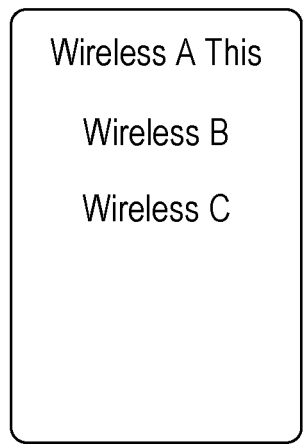
FIG. 15D-1
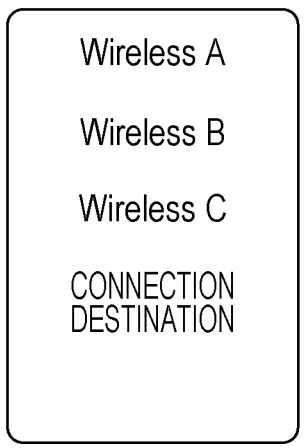
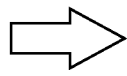
FIG. 15D-2
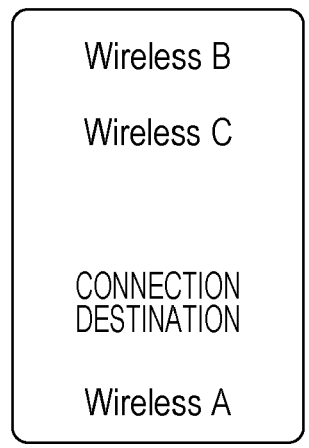

WIRELESS COMMUNICATION APPARATUS

CROSS-REFERENCE TO RELATED APPLICATIONS

This application is based on and claims priority under 35 USC 119 from Japanese Patent Application No. 2017-074294 filed Apr. 4, 2017.

BACKGROUND

(i) Technical Field

The present invention relates to a wireless communication apparatus.

(ii) Related Art

Identifiers (e.g., service set identifiers (SSIDs)) are assigned in advance to wireless local area networks (wireless LANs). Terminals acquire the identifiers from access points in the networks to perform a connection procedure by using the acquired identifiers.

SUMMARY

According to an aspect of the invention, there is provided a wireless communication apparatus including a transmission unit, a transmission controller, and an acceptance unit. The transmission unit transmits an identifier of a network to which the wireless communication apparatus belongs, without designating a destination. The transmission controller controls the transmission unit such that the identifier is presented in a different manner on a terminal that has received the identifier if movement of a person detected around the wireless communication apparatus is predetermined movement. The acceptance unit accepts a connection request using the identifier from the terminal.

BRIEF DESCRIPTION OF THE DRAWINGS

Exemplary embodiments of the present invention will be described in detail based on the following figures, wherein:

FIG. 8 illustrates a determination table;

FIGS. 15A to 15D-2 illustrate display examples of the terminal.

DETAILED DESCRIPTION

Exemplary Embodiments

Now, exemplary embodiments for implementing the present invention will be described.

Figure 1:
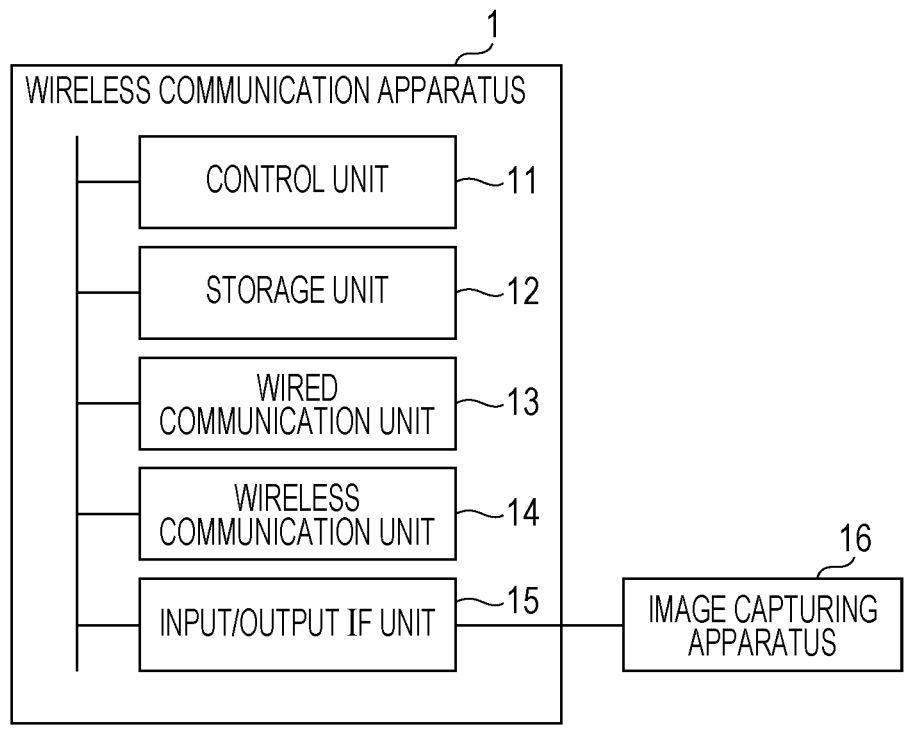
FIG. 1 illustrates a hardware configuration of a wireless communication apparatus.

FIG. 1 illustrates a hardware configuration of a wireless communication apparatus 1. The wireless communication apparatus 1 includes a control unit 11, a storage unit 12, a wired communication unit 13, a wireless communication unit 14, and an input/output interface (IF) unit 15. The storage unit 12 is a storage device such as memory and stores programs and data. The control unit 11 includes a processor and memory used as a work area for calculation and performs processes in accordance with the programs stored in the storage unit 12.

The wired communication unit 13 is a communication IF connected to a wired LAN. The wireless communication apparatus 1 communicates with an electronic device connected to the wired LAN through the wired communication unit 13. Examples of the electronic device include a router, another wireless communication apparatus having substantially the same functions as the wireless communication apparatus 1, a personal computer, a printer, a copier, and the like.

The wireless communication unit 14 is a communication IF connected to a wireless LAN. The wireless communication apparatus 1 communicates with a terminal 2 connected to the wireless LAN through the wireless communication unit 14. Details of a wireless LAN communication function will be described later.

The input/output IF unit 15 is a communication IF to which a peripheral device is connected. The peripheral device according to an exemplary embodiment is an image capturing apparatus 16 having a distance measuring function. An example of the image capturing apparatus 16 is a digital video camera. As the distance measuring function, for example, a known distance measuring function for measuring the distance between a camera and a subject at a time of autofocus image capturing is used. The subject in an exemplary embodiment is a person who possesses the terminal 2, and the distance measuring function is provided in order to measure the distance between the wireless communication apparatus 1 and the person who possesses the terminal 2. Thus, if an object is present between the wireless communication apparatus 1 and a person located at an unspecified position in a space where the wireless communication apparatus 1 is installed, the object may be an obstacle for capturing an image and for measuring the distance. Accordingly, the image capturing apparatus 16 may be set above the wireless communication apparatus 1. For example, the image capturing apparatus 16 may be set on the ceiling above the wireless communication apparatus 1, or a wall, a pillar, or the like near the wireless communication apparatus 1. If there is no appropriate place near the wireless communication apparatus 1, the image capturing apparatus 16 may be set on a tripod, for example.

Note that the wireless communication apparatus 1 may be built in or attached to an electronic device such as a copier or a printer. In this case, the image capturing apparatus 16 may be provided on or near the top end of the housing of the electronic device. In addition, the image capturing apparatus 16 may be integrally configured with the wireless communication apparatus 1. Instead of the image capturing apparatus 16, an image capturing apparatus that does not have a distance measuring function and a distance measuring apparatus may be provided.

Figure 2:
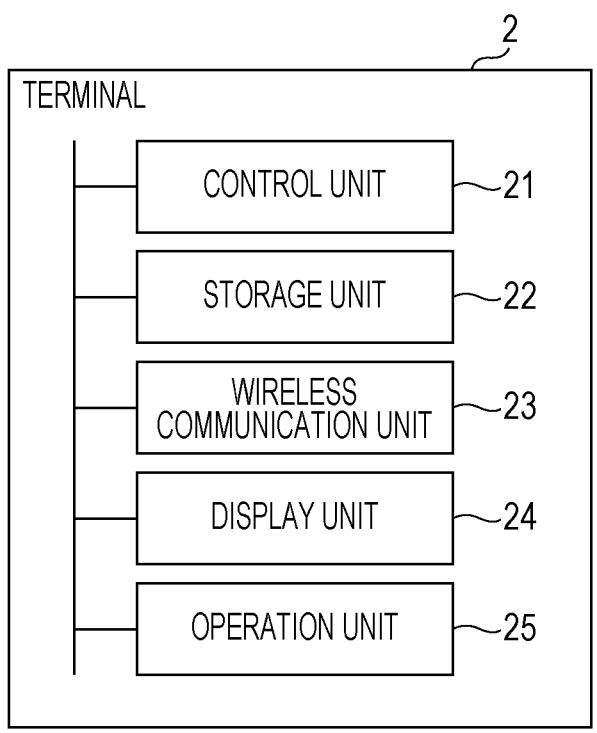
FIG. 2 illustrates a hardware configuration of a terminal.

FIG. 2 illustrates a hardware configuration of the terminal 2. Examples of the terminal 2 include a smartphone, a tablet, a personal computer, and the like. The terminal 2 includes a control unit 21, a storage unit 22, a wireless communication unit 23, a display unit 24, and an operation unit 25. The storage unit 22 is a storage device such as memory and stores programs and data. The control unit 21 includes a processor and memory used as a work area for calculation and performs processes in accordance with the programs stored in the storage unit 22. The wireless communication unit 23 is a communication IF connected to a wireless LAN. The display unit 24 displays a graphical use interface (GUI) screen for operating the terminal 2. The operation unit 25 is a touch panel or a pointing device such as a mouse and accepts an operation on the screen displayed by the display unit 24.

Next, the wireless LAN communication function of the wireless communication apparatus 1 will be described. The wireless communication apparatus 1 has an access point function and a station function as the wireless LAN communication function, and either of the above functions is selected so that the wireless communication apparatus 1 is operated by using the selected function. Hereinafter, an access point will be abbreviated as AP, and a station will be abbreviated as STA. The wireless communication apparatus 1 that is operated by using either the AP function or the STA function that has been selected performs ad-hoc-mode wireless LAN communication with a terminal having only the STA function or another wireless communication apparatus that is operated by using either the AP function or the STA function that has been selected. A known standard of the wireless communication apparatus 1 having both the AP function and the STA function is, for example, Wi-Fi Direct defined by the Wi-Fi Alliance. Note that, in addition to the AP function and the STA function, the wireless communication apparatus 1 may have a function of a router of the wireless LAN.

If the AP function (example of first function) is selected, the wireless communication apparatus 1 transmits the identifier of a network to which the wireless communication apparatus 1 belongs, without designating the destination (example of transmission unit). Specifically, the wireless communication apparatus 1 transmits, on a predetermined cycle, a beacon including an SSID that is set for the network to which the wireless communication apparatus 1 belongs.

The terminal 2 has the STA function. The terminal 2 transmits a connection request to the wireless communication apparatus 1 by using the identifier received from the wireless communication apparatus 1. Specifically, the terminal 2 that has received beacons displays identifiers included in the beacons. A user of the terminal 2 (person who possesses the terminal 2) selects any one of the displayed identifiers. The terminal 2 transmits a connection request including the selected identifier to the wireless communication apparatus 1. The wireless communication apparatus 1 accepts the connection request from the terminal 2 (example of acceptance unit), performs authentication using a known decryption technique or the like, and establishes the connection.

On the other hand, if the STA function (example of second function) is selected, the wireless communication apparatus 1 transmits a connection request to another wireless communication apparatus by using an identifier received from the other wireless communication apparatus (example of request unit). That is, the wireless communication apparatus 1 for which the STA function is selected serves in substantially the same manner as the terminal 2 having the STA function.

The wireless communication apparatus 1 has a stealth function for concealing an identifier. The wireless communication apparatus 1 for which the stealth function is activated prevents an identifier from being transmitted to the terminal 2 by, for example, transmitting a beacon that does not include the identifier. In this case, since the identifier of the wireless communication apparatus 1 is not displayed on the terminal 2, a user is not capable of selecting the identifier. However, when the terminal 2 transmits a probe request, the wireless communication apparatus 1 that has received the probe request transmits a probe response including the identifier, and then the identifier included in the probe response is displayed on the terminal 2. A user selects the identifier, and thereby a connection request using the identifier is transmitted to the wireless communication apparatus 1.

The wireless communication apparatus 1 performs processes using image data received from the image capturing apparatus 16. The control unit 11 of the wireless communication apparatus 1 detects a person or persons by analyzing the image data with a known image processing technique, detects movement of the detected person(s), and determines the type or types of detected movement and the number of detected persons. Any movement made when a person moves their body may be determined as the type of movement, and desirably is, for example, movement of a hand or an arm such as a raised hand, a waving hand, or clapping hands.

First Exemplary Embodiment

The control unit 11 transmits the identifier of a network to which the wireless communication apparatus 1 belongs, without designating the destination (example of transmission unit). If movement of a person detected around the wireless communication apparatus 1 is predetermined movement, the control unit 11 controls the transmission unit such that the identifier is presented in a different manner on the terminal 2 that has received the identifier (example of transmission controller).

Figure 3:
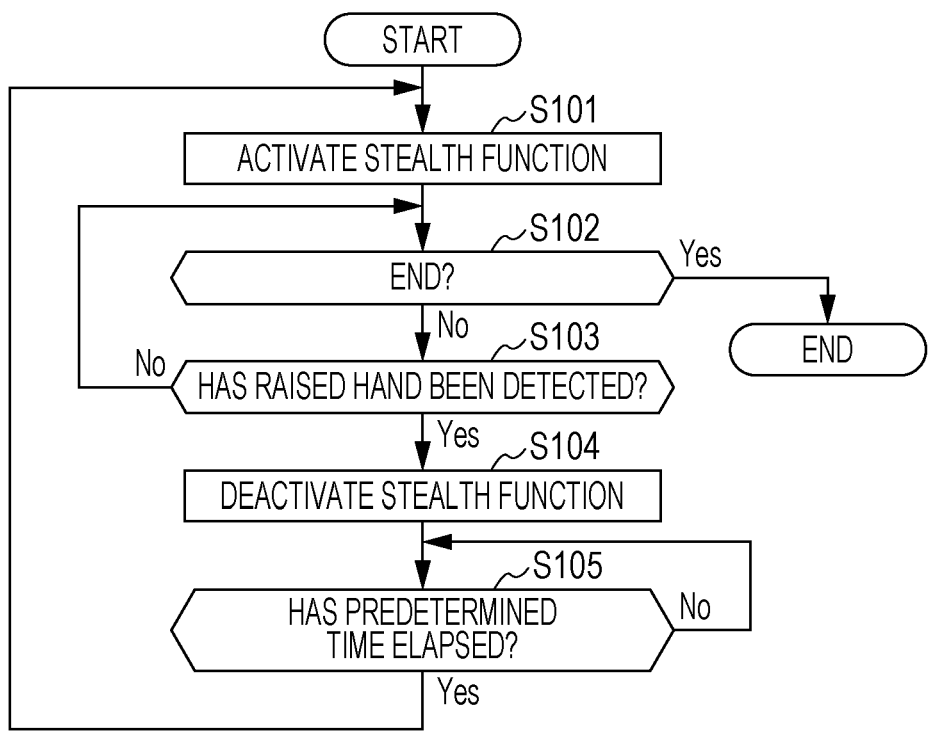
FIG. 3 is a flowchart of a control process.

FIG. 3 is a flowchart of a control process. The control unit 11 performs the control process in accordance with a program installed in the wireless communication apparatus 1. The control process may be performed at any time or may be started in response to an instruction from a server or the like.

In the following example, there are three wireless communication apparatuses 1, and identifiers "Wireless A", "Wireless B", and "Wireless C" are set for the respective wireless communication apparatuses 1. Now, a control process performed in the wireless communication apparatus 1 of "Wireless A" will be described below.

First, the control unit 11 activates the stealth function (step S101).

Figure 4A:
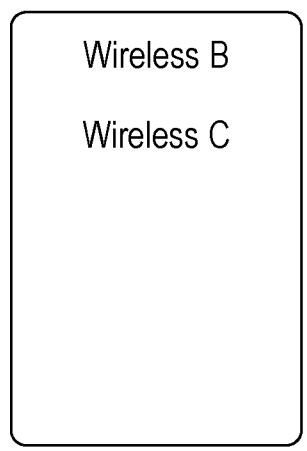
FIGS. 4A and 4B illustrate display examples of the terminal.
Figure 4B:
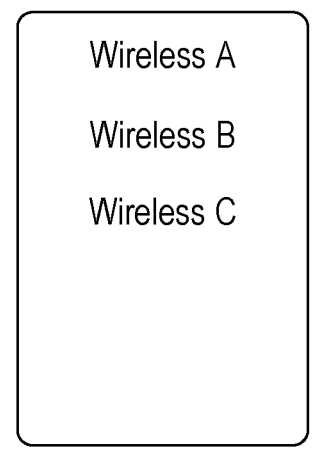

FIGS. 4A and 4B illustrate display examples of the terminal 2. As illustrated in FIG. 4A, although "Wireless B" and "Wireless C" are displayed, "Wireless A" for which the stealth function has been activated is not displayed.

Subsequently, the control unit 11 determines whether the control process is to end (step S102). For example, if an end instruction is received from a server or the like, or if the wireless communication apparatus 1 is shut down, the control unit 11 determines that the control process is to end. If it is determined that the control process is to end (YES in step S102), the control unit 11 ends the control process. If it is determined that the control process is not to end (NO in step S102), the control unit 11 analyzes image data received from the image capturing apparatus 16 and determines whether a raised hand has been detected (step S103). If a raised hand has not been detected (NO in step S103), the process performed by the control unit 11 returns to step S102. If a raised hand has been detected (YES in step S103), the control unit 11 deactivates the stealth function (step S104). Thus, as illustrated in FIG. 4B, "Wireless A" is displayed on the terminal 2. When a person who possesses the terminal 2 selects "Wireless A", a connection request is transmitted from the terminal 2 to the wireless communication apparatus 1, and the wireless communication apparatus 1 accepts the connection request and performs a connection procedure (example of acceptance unit).

Subsequently, the control unit 11 measures the time that has elapsed after step S104 and determines whether predetermined time has elapsed (step S105). If predetermined time has elapsed (YES in step S105), the process performed by the control unit 11 returns to step S101. That is, if predetermined time has elapsed, "Wireless A" is no longer displayed.

Figure 5A:
FIGS. 5A and 5B illustrate other display examples of the terminal.
Figure 5B:
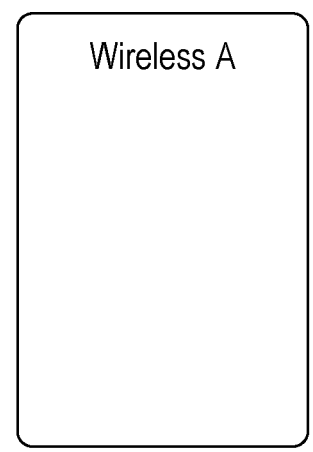

FIGS. 5A and 5B illustrate other display examples of the terminal 2. These examples correspond to a case in which "Wireless B" and "Wireless C" are not displayed by the stealth function, a case in which "Wireless B" and "Wireless C" are not operated, or the like. When the stealth function is activated, no identifiers are displayed as illustrated in FIG. 5A; when the stealth function is deactivated, "Wireless A" is displayed as illustrated in FIG. 5B.

Second Exemplary Embodiment

The control unit 11 of the subject wireless communication apparatus 1 notifies other wireless communication apparatuses 1 of the distance between a person and the subject wireless communication apparatus 1 (example of notification unit). The control unit 11 acquires the distance between the person and each of the other wireless communication apparatuses (example of acquisition unit). If the distance between the person and the subject wireless communication apparatus 1 is smaller than the distance between the person and any other wireless communication apparatus 1, the control unit 11 controls the transmission unit such that the identifier is presented in a different manner on the terminal 2 (example of transmission controller).

Figure 6:
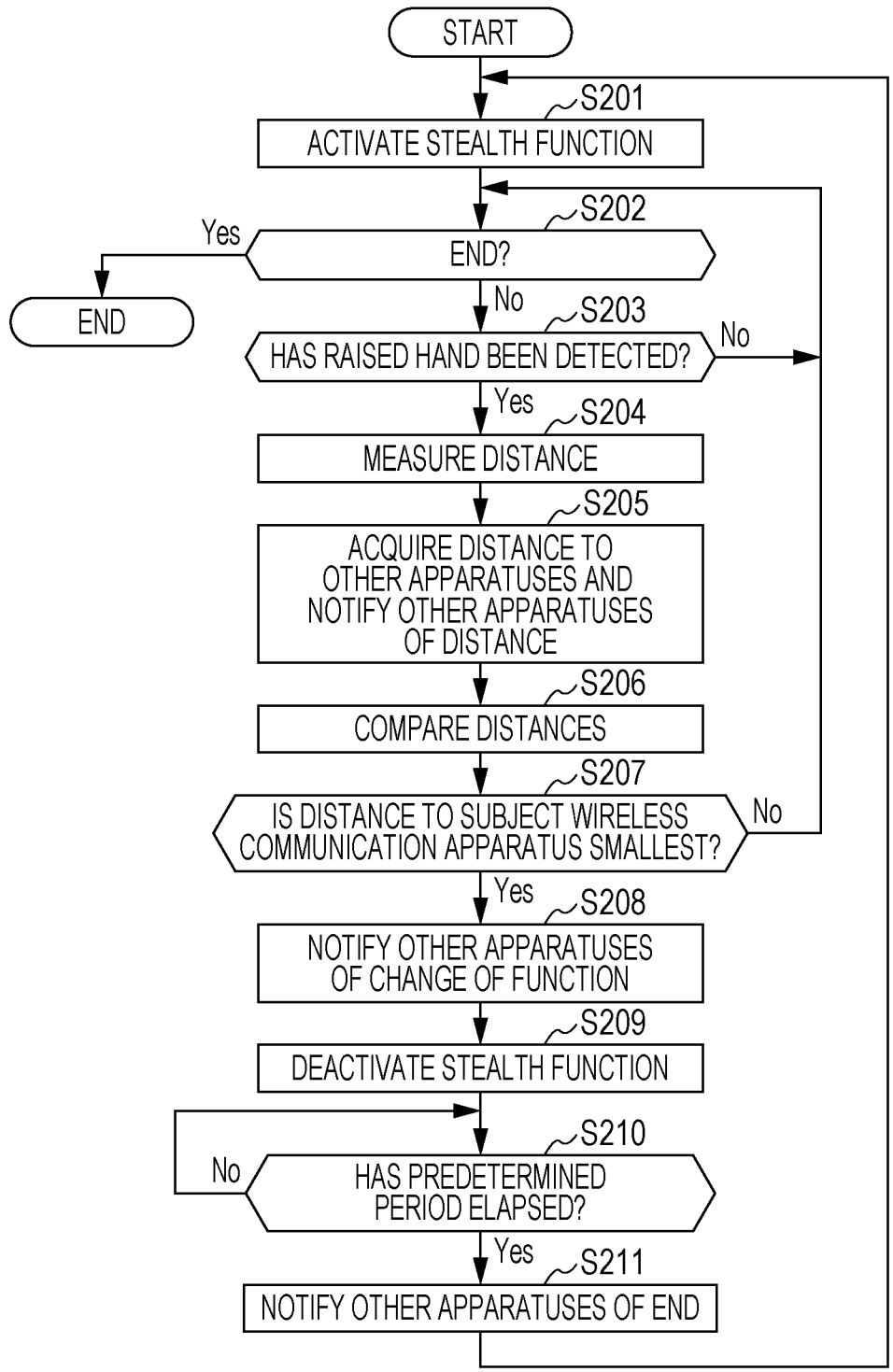
FIG. 6 is a flowchart of a control process.

FIG. 6 is a flowchart of a control process. First, the control unit 11 activates the stealth function (step S201). As illustrated in FIG. 4A, "Wireless B" and "Wireless C" are displayed, but "Wireless A" is not displayed.

Subsequently, the control unit 11 determines whether the control process is to end (step S202). If it is determined that the control process is to end (YES in step S202), the control unit 11 ends the control process. If it is determined that the control process is not to end (NO in step S202), the control unit 11 analyzes image data received from the image capturing apparatus 16 and determines whether a raised hand has been detected (step S203). If a raised hand has not been detected (NO in step S203), the process performed by the control unit 11 returns to step S202. If a raised hand has been detected (YES in step S203), the control unit 11 measures the distance between a person who has raised their hand and the subject wireless communication apparatus 1 by using the distance measuring function of the image capturing apparatus 16 (step S204).

Subsequently, the control unit 11 acquires distance information indicating the distance between the person and each of the other wireless communication apparatuses 1. Specifically, since each of the other wireless communication apparatuses 1 has a function of measuring the distance between the person and a corresponding one of the other wireless communication apparatuses 1 as in the subject wireless communication apparatus 1, the control unit 11 requests the distance information from each of the other wireless communication apparatuses 1 and acquires the distance information. In addition, the control unit 11 notifies each of the other wireless communication apparatuses 1 of the distance between the person and the subject wireless communication apparatus 1 (example of notification unit) (step S205). Note that the communication between the subject wireless communication apparatus 1 and the other wireless communication apparatuses 1 may be performed via a wired LAN or a wireless LAN.

Subsequently, the control unit 11 compares the distance between the person and the subject wireless communication apparatus 1 with the distance between the person and each of the other wireless communication apparatuses 1 (step S206) and determines whether the distance between the person and the subject wireless communication apparatus 1 is the smallest among the distances between the person and the wireless communication apparatuses 1 (step S207). If the distance between the person and the subject wireless communication apparatus 1 is not the smallest (NO in step S207), the process performed by the control unit 11 returns to step S202. If the distance between the person and the subject wireless communication apparatus 1 is the smallest (YES in step S207), the control unit 11 notifies the other wireless communication apparatuses 1 of a change in the function (deactivation of the stealth function in this example) (step S208), and deactivates the stealth function (step S209). Thus, as illustrated in FIG. 4B, "Wireless A" is displayed on the terminal 2. When a person who possesses the terminal 2 selects "Wireless A", a connection request is transmitted to the subject wireless communication apparatus 1, and the subject wireless communication apparatus 1 accepts the connection request and performs a connection procedure.

Subsequently, the control unit 11 measures the time that has elapsed after step S209 and determines whether predetermined time has elapsed (step S210). If predetermined time has elapsed (YES in step S210), the control unit 11 notifies the other wireless communication apparatuses 1 that a change in the function (deactivation of the stealth function) is to end (step S211), and the process returns to step S201. That is, if predetermined time has elapsed, "Wireless A" is no longer displayed.

Third Exemplary Embodiment

If the type of movement of a person is any one of plural predetermined types of movement, the control unit 11 selects any one of plural functions of the subject wireless communication apparatus 1 in accordance with the type of the movement of a person (example of selection unit). By transmitting an identifier in accordance with the selected function, the control unit 11 controls the transmission unit such that the identifier is presented in a different manner on the terminal 2 (example of transmission controller).

Figure 7:
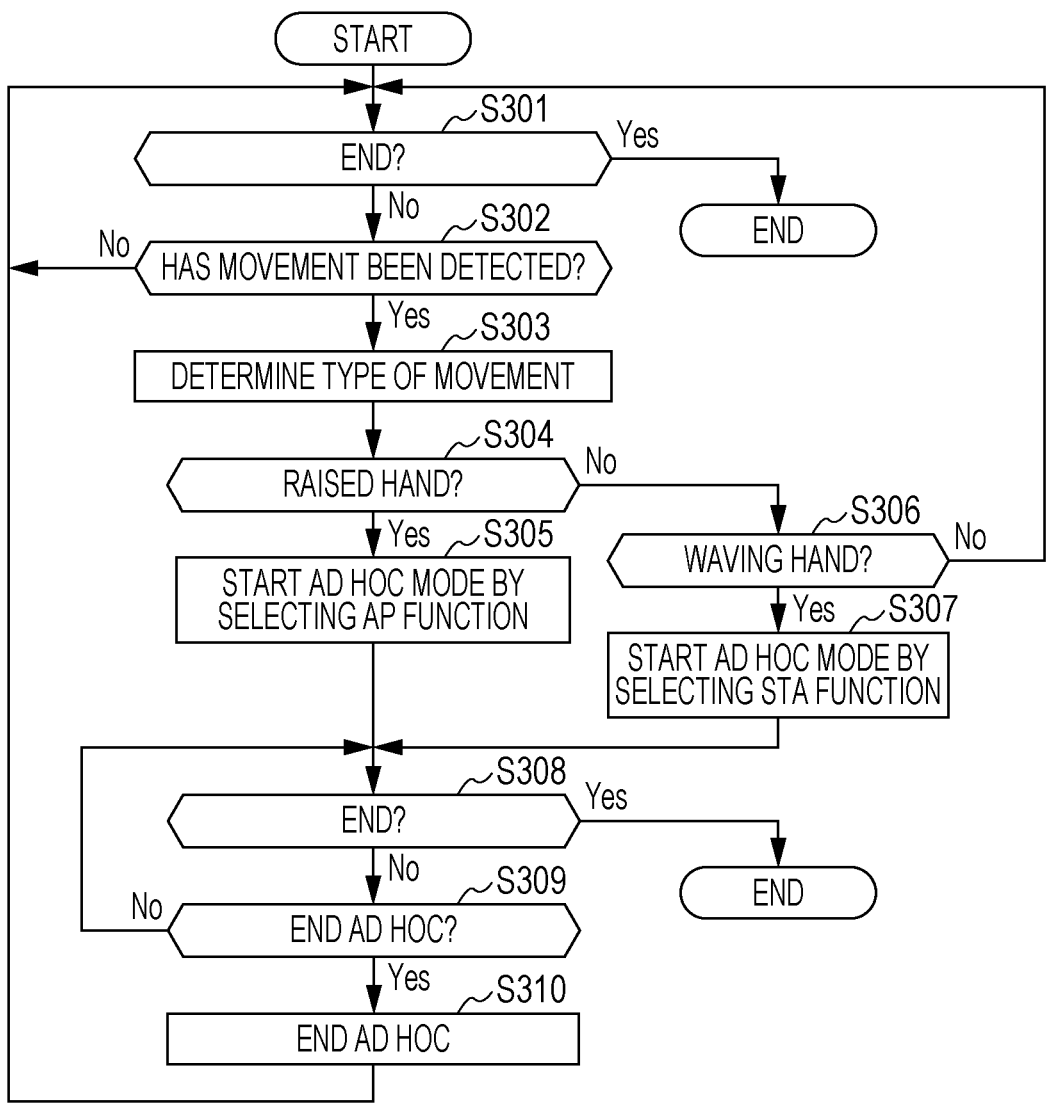
FIG. 7 is a flowchart of a control process.

FIG. 7 is a flowchart of a control process. First, the control unit 11 determines whether the control process is to end (step S301). If it is determined that the control process is to end (YES in step S301), the control unit 11 ends the control process. If it is determined that the control process is not to end (NO in step S301), the control unit 11 analyzes image data received from the image capturing apparatus 16 and determines whether movement of a person has been detected (step S302). If movement of a person has not been detected (NO in step S302), the process performed by the control unit 11 returns to step S301. If movement of a person has been detected (YES in step S302), the control unit 11 determines the type of movement (step S303).

FIG. 8 illustrates a determination table. In the determination table, the types of movement of a person are associated with functions to be selected by the subject wireless communication apparatus 1, and the determination table is stored in the storage unit 12. In the illustrated example, as the functions to be selected, the AP function is associated with a raised hand, and the STA function is associated with a waving hand. If the type of movement is a raised hand (YES in step S304), the control unit 11 starts the ad hoc mode by selecting the AP function (step S305). Subsequently, the control unit 11 starts to transmit a beacon including an identifier in accordance with the selected function.

Figure 9A:
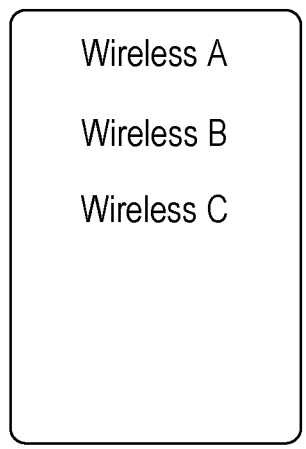
FIGS. 9A and 9B illustrate display examples of the terminal.
Figure 9B:
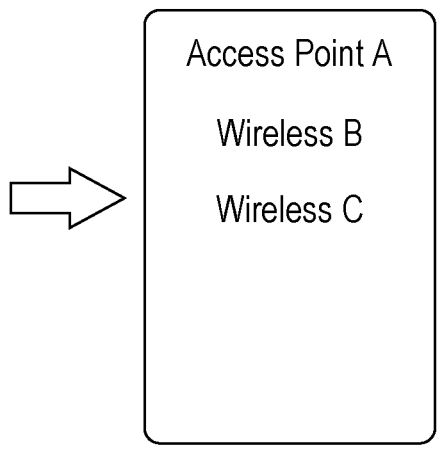

FIGS. 9A and 9B illustrate display examples of the terminal 2. FIG. 9A illustrates a display example before movement of a person is detected. "Wireless A (B, C)" in this example is an identifier indicating that none of the AP function and the STA function is selected. If the type of movement is a raised hand, the control unit 11 transmits a beacon in which the identifier is changed to "Access Point A". In response, as illustrated in FIG. 9B, "Access Point A" is displayed in place of "Wireless A" on the terminal 2. When a person who possesses the terminal 2 selects "Access Point A", a connection request is transmitted to the subject wireless communication apparatus 1, and the subject wireless communication apparatus 1 accepts the connection request and performs a connection procedure.

On the other hand, if the type of movement is not a raised hand but a waiving hand (NO in step S304, YES in step S306), the control unit 11 starts the ad hoc mode by selecting the STA function (step S307). In this case, the control unit 11 transmits a beacon in which the identifier is changed to "Station A". In response, "Station A" is displayed in place of "Wireless A" on the terminal 2. When a person who possesses the terminal 2 selects "Station A", a connection request is transmitted to the subject wireless communication apparatus 1, and the subject wireless communication apparatus 1 accepts the connection request and performs a connection procedure. If the type of movement is neither a raised hand nor a waiving hand (NO in step S304, NO in step S306), the process performed by the control unit 11 returns to step S301.

Subsequently, the control unit 11 determines whether the control process is to end (step S308). If it is determined that the control process is to end (YES in step S308), the control unit 11 ends the control process. If it is determined that the control process is not to end (NO in step S308), the control unit 11 determines whether the ad hoc mode is to end (step S309). If a notification about the end of communication has been transmitted from the terminal 2, the control unit 11 determines that the ad hoc mode is to end (YES in step S309) and ends the ad hoc mode (step S310), and the process returns to step S301. If a notification about the end of communication has not been transmitted from the terminal 2, the control unit 11 determines that the ad hoc mode is not to end (NO in step S309), and the process performed by the control unit 11 returns to step S308.

Fourth Exemplary Embodiment

If movement of two persons or more has been detected, the control unit 11 selects a function associated with the type of movement of a person who is the closest to the subject wireless communication apparatus 1 (example of selection unit).

Figure 10:
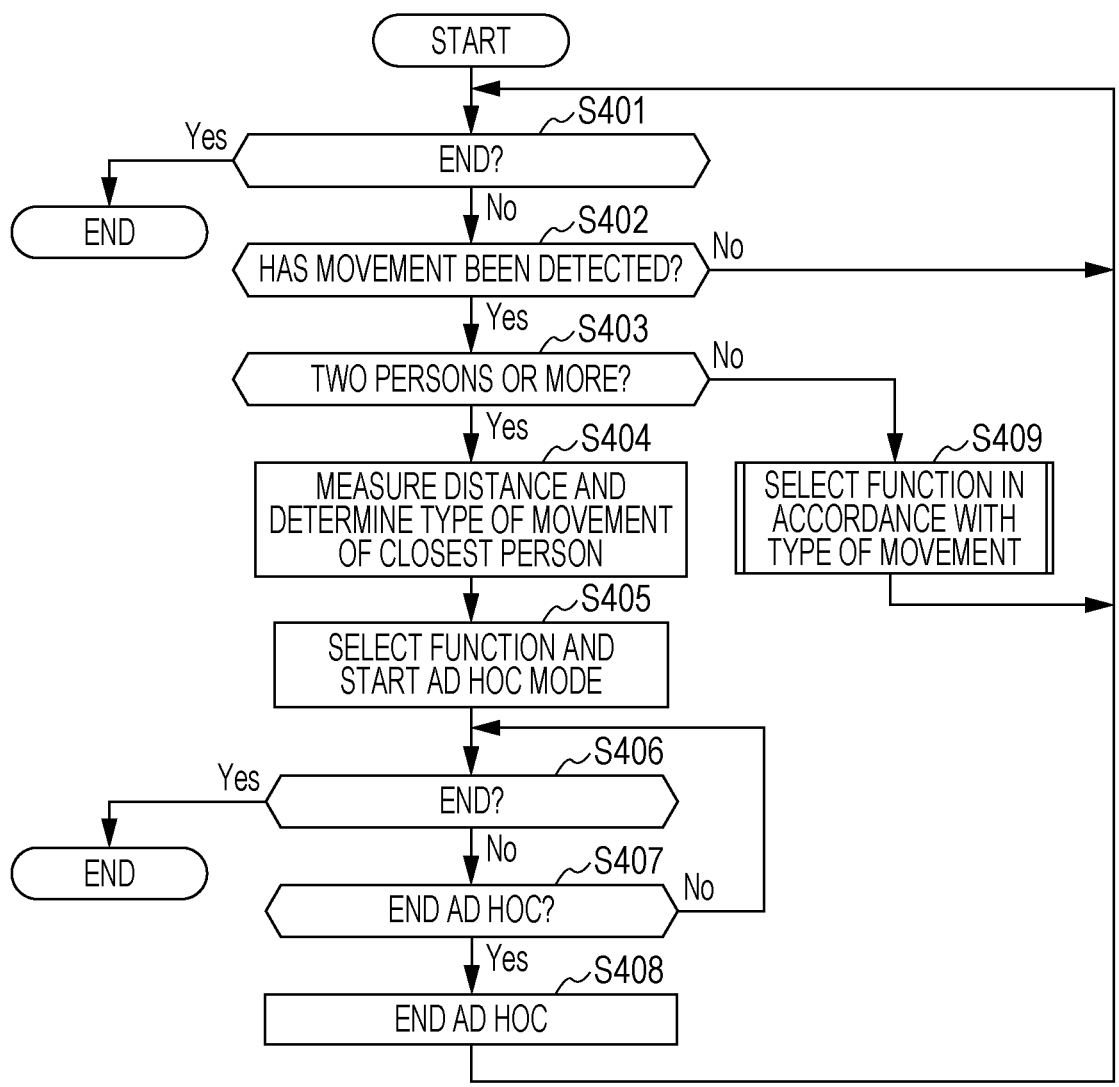
FIG. 10 is a flowchart of a control process.

FIG. 10 is a flowchart of a control process. First, control unit 11 determines whether the control process is to end (step S401). If it is determined that the control process is to end (YES in step S401), the control unit 11 ends the control process. If it is determined that the control process is not to end (NO in step S401), the control unit 11 analyzes image data received from the image capturing apparatus 16 and determines whether movement of a person or persons has been detected (step S402). If movement of a person or persons has not been detected (NO in step S402), the process performed by the control unit 11 returns to step S401. If movement of a person or persons has been detected (YES in step S402), the control unit 11 determines whether the number of the detected persons is two or more (step S403). If the number of the detected persons is two or more (YES in step S403), the control unit 11 measures the distance to each of the detected persons and determines the type of movement of the closest person (step S404). Subsequently, the control unit 11 selects a function (AP function or STA function) associated with the type of movement by referring to the determination table and starts the ad hoc mode (step S405). Subsequently, a connection procedure is performed in substantially the same manner as in the third exemplary embodiment.

Subsequently, the control unit 11 determines whether the control process is to end (step S406). If it is determined that the control process is to end (YES in step S406), the control unit 11 ends the control process. If it is determined that the control process is not to end (NO in step S406), the control unit 11 determines whether the ad hoc mode is to end (step S407). If a notification about the end of communication has been transmitted from the terminal 2, the control unit 11 determines that the ad hoc mode is to end (YES in step S407) and ends the ad hoc mode (step S408), and the process returns to step S401. If a notification about the end of communication has not been transmitted from the terminal 2, the control unit 11 determines that the ad hoc mode is not to end (NO in step S407), and the process performed by the control unit 11 returns to step S406. If the number of the detected persons is one (NO in step S403), as in the third exemplary embodiment, the ad hoc mode is started by using a function selected in accordance with the type of the detected movement (step S409).

Fifth Exemplary Embodiment

If movement of two persons or more and plural types of movement have been detected, the control unit 11 selects a function whose predetermined priority is the highest from among functions associated with the respective plural types of movement (example of selection unit).

Figure 11:
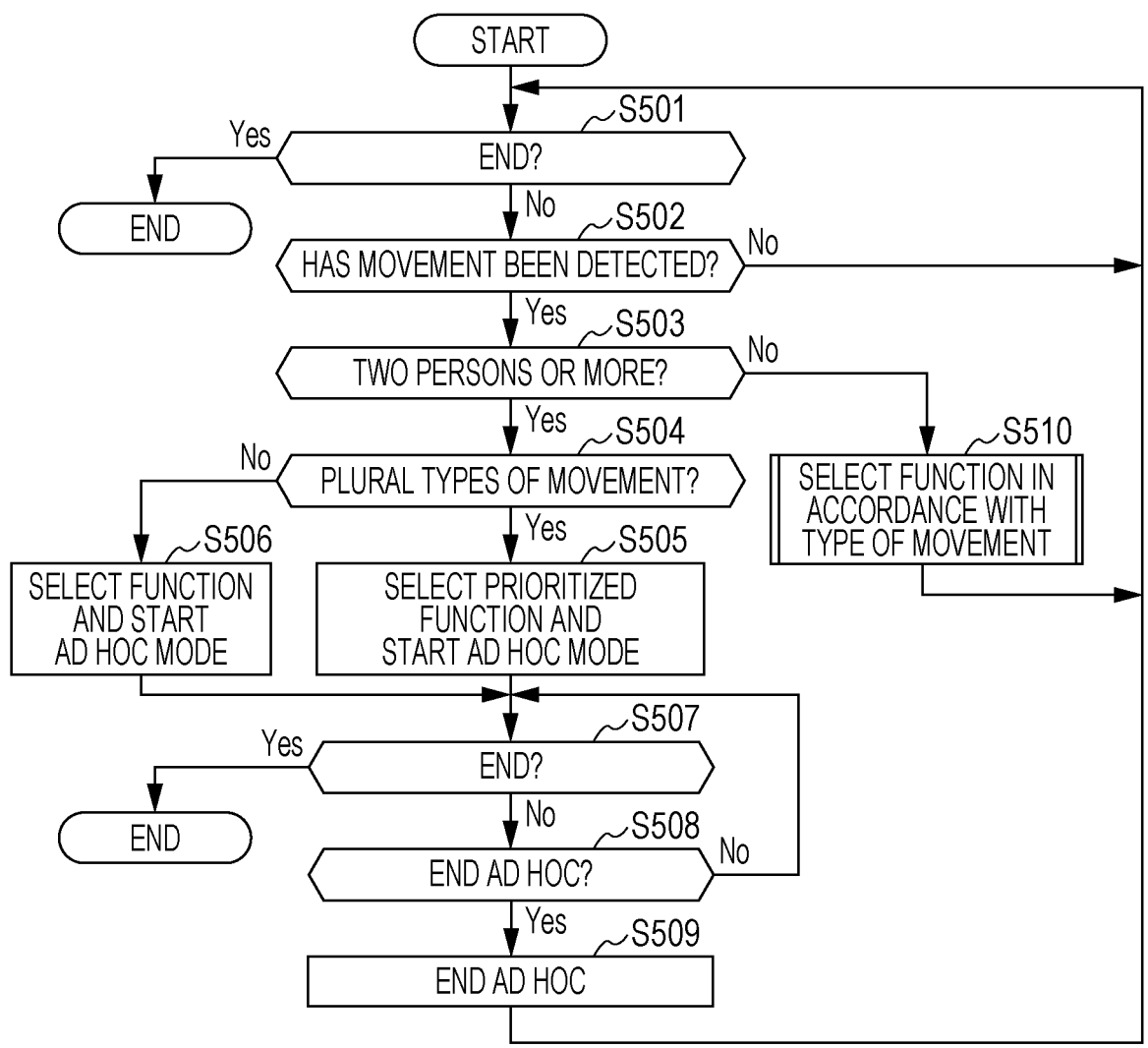
FIG. 11 is a flowchart of a control process.

FIG. 11 is a flowchart of a control process. First, the control unit 11 determines whether the control process is to end (step S501). If it is determined that the control process is to end (YES in step S501), the control unit 11 ends the control process. If it is determined that the control process is not to end (NO in step S501), the control unit 11 analyzes image data received from the image capturing apparatus 16 and determines whether movement of a person or persons has been detected (step S502). If movement of a person or persons has not been detected (NO in step S502), the process performed by the control unit 11 returns to step S501. If movement of a person or persons has been detected (YES in step S502), the control unit 11 determines whether the number of the detected persons is two or more (step S503). If the number of the detected persons is two or more (YES in step S503), the control unit 11 determines whether plural types of movement have been detected (step S504).

If plural types of movement have been detected (YES in step S504), the control unit 11 selects a function whose priority is the highest from among functions associated with the respective plural types of movement by referring to the determination table and starts the ad hoc mode (step S505). For example, if a raised hand and a waving hand have been detected, since the priority of the AP function associated with the raised hand is the higher, the AP function is selected. An identifier associated with the selected function is displayed on the terminal 2.

On the other hand, if a single type of movement has been detected (NO in step S504), the control unit 11 selects a function associated with the type of movement by referring to the determination table and starts the ad hoc mode (step S506).

Subsequently, the control unit 11 determines whether the control process is to end (step S507). If it is determined that the control process is to end (YES in step S507), the control unit 11 ends the control process. If it is determined that the control process is not to end (NO in step S507), the control unit 11 determines whether the ad hoc mode is to end (step S508). If a notification about the end of communication has been transmitted from the terminal 2, the control unit 11 determines that the ad hoc mode is to end (YES in step S508) and ends the ad hoc mode (step S509), and the process returns to step S501. If a notification about the end of communication has not been transmitted from the terminal 2, the control unit 11 determines that the ad hoc mode is not to end (NO in step S508), and the process performed by the control unit 11 returns to step S507.

If the number of the detected persons is one (NO in step S503), as in the third exemplary embodiment, the ad hoc mode is started by using a function selected in accordance with the type of the detected movement (step S510).

Sixth Exemplary Embodiment

If movement of three persons or more and plural types of movement have been detected, the control unit 11 selects a function associated with a type of movement of the largest number of persons detected among the plural types of movement (example of selection unit).

Figure 12:
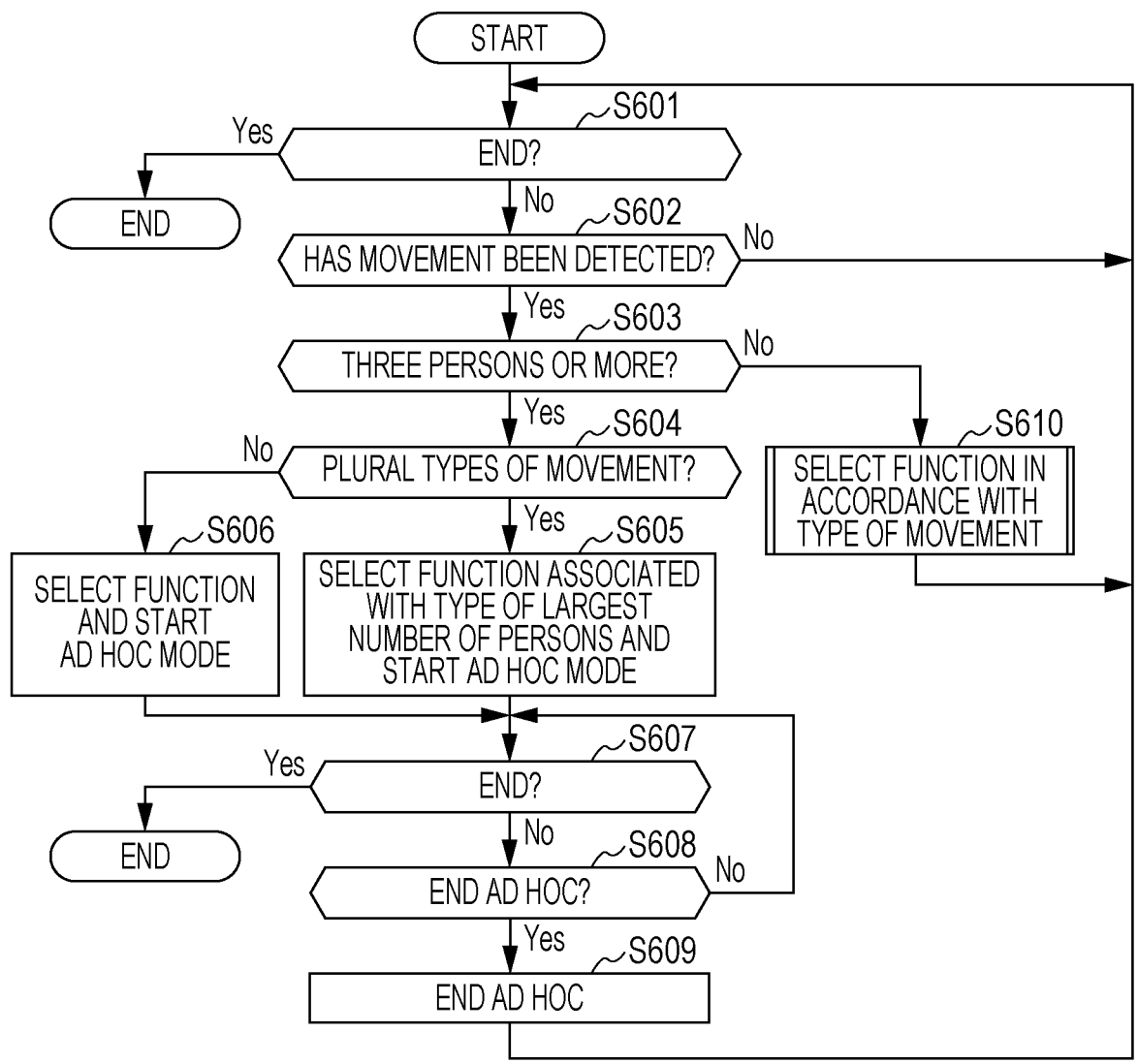
FIG. 12 is a flowchart of a control process.

FIG. 12 is a flowchart of a control process. First, the control unit 11 determines whether the control process is to end (step S601). If it is determined that the control process is to end (YES in step S601), the control unit 11 ends the control process. If it is determined that the control process is not to end (NO in step S601), the control unit 11 analyzes image data received from the image capturing apparatus 16 and determines whether movement of a person or persons has been detected (step S602). If movement of a person or persons has not been detected (NO in step S602), the process performed by the control unit 11 returns to step S601. If movement of a person or persons has been detected (YES in step S602), the control unit 11 determines whether the number of the detected persons is three or more (step S603). If the number of the persons is three or more (YES in step S603), the control unit 11 determines whether plural types of movement have been detected (step S604).

If plural types of movement have been detected (YES in step S604), the control unit 11 selects a function associated with a type of movement of the largest number of the detected persons by referring to the determination table and starts the ad hoc mode (step S605). An identifier associated with the selected function is displayed on the terminal 2.

On the other hand, if a single type of movement has been detected (NO in step S604), the control unit 11 selects a function associated with the movement by referring to the determination table and starts the ad hoc mode (step S606).

Subsequently, the control unit 11 determines whether the control process is to end (step S607). If it is determined that the control process is to end (YES in step S607), the control unit 11 ends the control process. If it is determined that the control process is not to end (NO in step S607), the control unit 11 determines whether the ad hoc mode is to end (step S608). If a notification about the end of communication has been transmitted from the terminal 2, the control unit 11 determines that the ad hoc mode is to end (YES in step S608) and ends the ad hoc mode (step S609), and the process returns to step S601. If a notification about the end of communication has not been transmitted from the terminal 2, the control unit 11 determines that the ad hoc mode is not to end (NO in step S608), and the process performed by the control unit 11 returns to step S607.

If the number of the detected persons is two or less (NO in step S603), the ad hoc mode is started by using a function selected in accordance with the type of the detected movement (step S610) in substantially the same manner as in the fourth or fifth exemplary embodiment.

Seventh Exemplary Embodiment

If movement of two persons or more has been detected by the subject wireless communication apparatus 1 and other wireless communication apparatuses 1 and the distance to a person who is the closest to the subject wireless communication apparatus 1 is less than or equal to a threshold, the control unit 11 selects a function associated with the type of movement of the person (example of selection unit).

Figure 13:
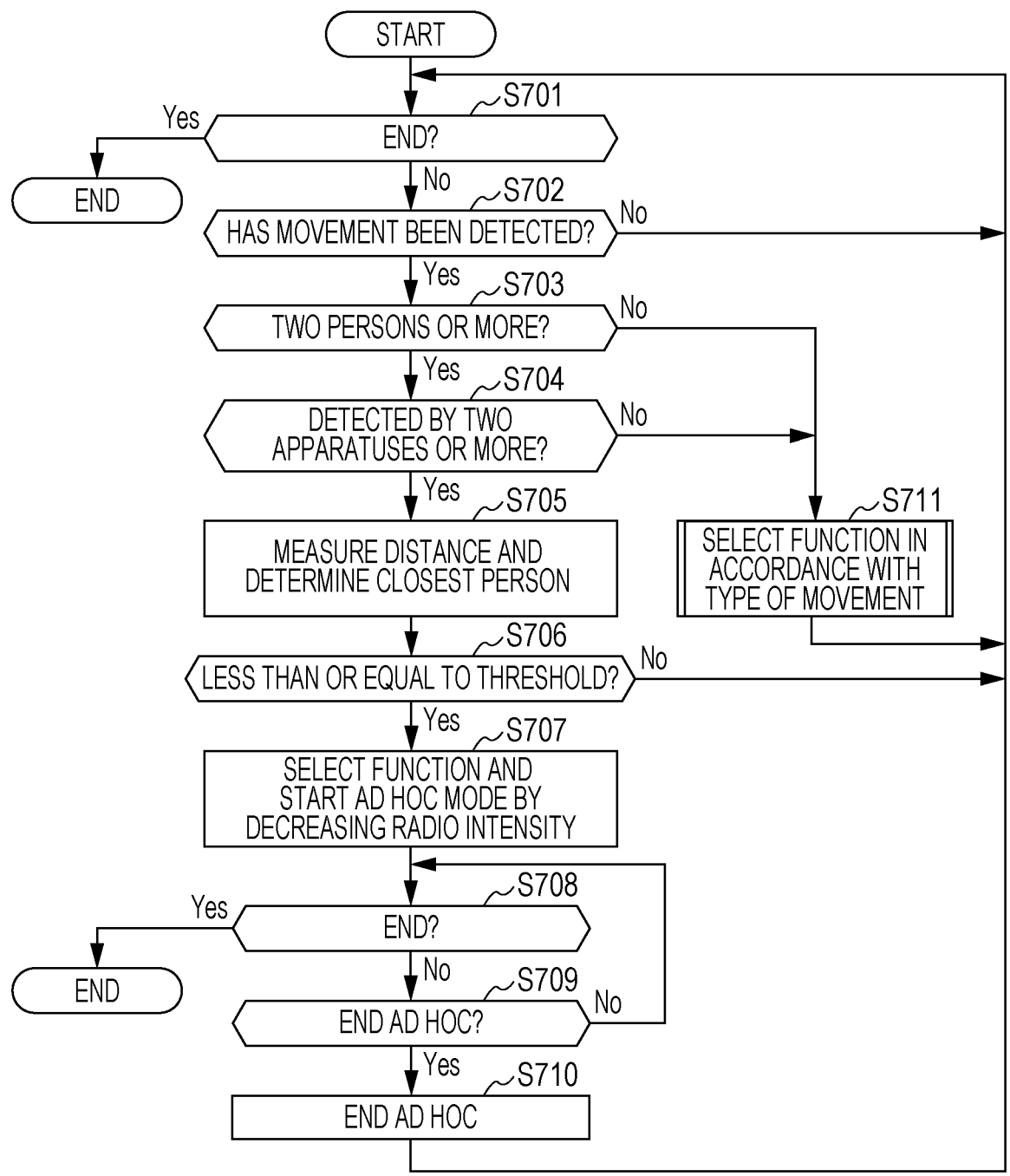
FIG. 13 is a flowchart of a control process.

FIG. 13 is a flowchart of a control process. First, the control unit 11 determines whether the control process is to end (step S701). If it is determined that the control process is to end (YES in step S701), the control unit 11 ends the control process. If it is determined that the control process is not to end (NO in step S701), the control unit 11 analyzes image data received from the image capturing apparatus 16 and determines whether movement of a person or persons has been detected (step S702). If movement of a person or persons has not been detected (NO in step S702), the process performed by the control unit 11 returns to step S701. If movement of a person or persons has been detected (YES in step S702), the control unit 11 determines whether the number of the detected persons is two or more (step S703).

If the number of the detected persons is two or more (YES in step S703), the control unit 11 makes an inquiry to other wireless communication apparatuses 1 as to whether movement of two persons or more has been detected (step S704). If the other wireless communication apparatuses 1 have also detected movement of two persons or more (YES in step S704), the control unit 11 measures the distance between the subject wireless communication apparatus 1 and each of the detected persons and specifies the closest person (step S705).

Subsequently, if the distance to the closest person is less than or equal to a threshold (YES in step S706), the control unit 11 selects a function associated with the movement of this person by referring to the determination table and starts the ad hoc mode by decreasing the radio intensity to predetermined intensity (step S707). If the distance to the closest person is greater than the threshold (NO in step S706), the process performed by the control unit 11 returns to step S701.

Subsequently, the control unit 11 determines whether the control process is to end (step S708). If it is determined that the control process is to end (YES in step S708), the control unit 11 ends the control process. If it is determined that the control process is not to end (NO in step S708), the control unit 11 determines whether the ad hoc mode is to end (step S709). If a notification about the end of communication has been transmitted from the terminal 2, the control unit 11 determines that the ad hoc mode is to end (YES in step S709) and ends the ad hoc mode (step S710), and the process returns to step S701. If a notification about the end of communication has not been transmitted from the terminal 2, the control unit 11 determines that the ad hoc mode is not to end (NO in step S709), and the process performed by the control unit 11 returns to step S708.

If the number of the detected persons is one (NO in step S703), or if the other wireless communication apparatuses 1 have not detected movement of two persons or more (NO in step S704), the ad hoc mode is started by using a function selected in accordance with the type of movement (step S711) in substantially the same manner as in the fourth or fifth exemplary embodiment.

Eighth Exemplary Embodiment

If movement of two persons or more has been detected by the subject wireless communication apparatus 1 and other wireless communication apparatuses 1, the control unit 11 selects a function in accordance with a procedure corresponding to the distance to a person who is the closest to the subject wireless communication apparatus 1, from among plural predetermined procedures (example of selection unit). Specifically, the control unit 11 selects a function under a different condition in accordance with the distance to the person who is the closest to the subject wireless communication apparatus 1. For example, if the distance to the person who is the closest to the subject wireless communication apparatus 1 is less than a first threshold, the control unit 11 selects a function associated with the type of movement of the person who is the closest to the subject wireless communication apparatus 1; if the distance to the person who is the closest to the subject wireless communication apparatus 1 is greater than or equal to the first threshold and less than a second threshold, the control unit 11 selects a function whose predetermined priority is the highest from among functions associated with the types of the detected movement; and if the distance to the person who is the closest to the subject wireless communication apparatus 1 is greater than or equal to the second threshold and less than a third threshold, the control unit 11 selects a function associated with a type of movement of the largest number of persons detected among the types of the detected movement.

Figure 14:
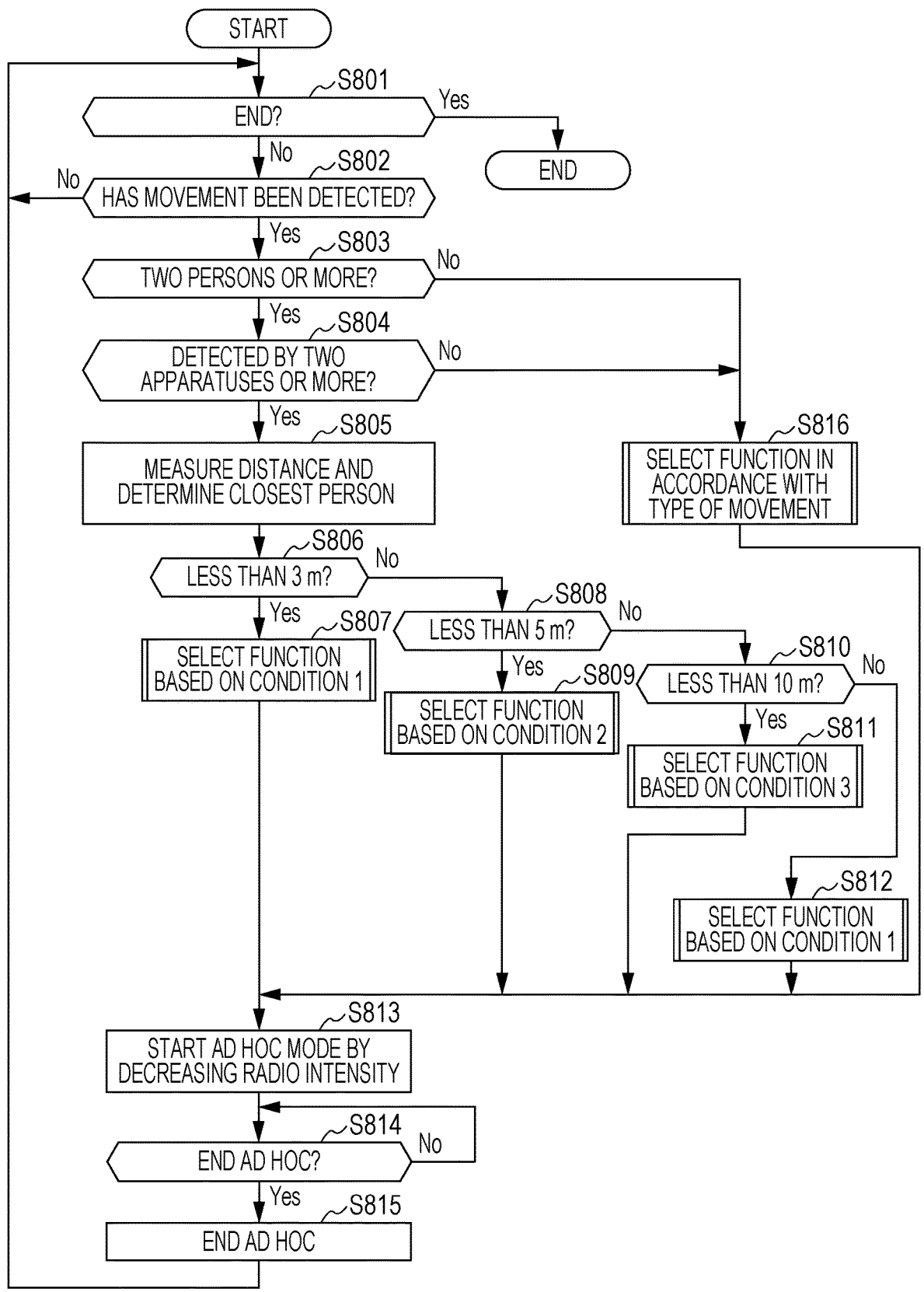
FIG. 14 is a flowchart of a control process.

FIG. 14 is a flowchart of a control process. First, the control unit 11 determines whether the control process is to end (step S801). If it is determined that the control process is to end (YES in step S801), the control unit 11 ends the control process. If it is determined that the control process is not to end (NO in step S801), the control unit 11 analyzes image data received from the image capturing apparatus 16 and determines whether movement of a person or persons has been detected (step S802). If movement of a person or persons has not been detected (NO in step S802), the process performed by the control unit 11 returns to step S801. If movement of a person or persons has been detected (YES in step S802), the control unit 11 determines whether the number of the detected persons is two or more (step S803).

If the number of persons is two or more (YES in step S803), the control unit 11 makes an inquiry to other wireless communication apparatuses 1 as to whether movement of two persons or more has been detected (step S804). If the other wireless communication apparatuses 1 have also detected movement of two persons or more (YES in step S804), the control unit 11 measures the distance between the subject wireless communication apparatus 1 and each of the detected persons and specifies the closest person (step S805).

Subsequently, if the distance to the closest person is less than 3 m (example of first threshold) (YES in step S806), the control unit 11 selects a function associated with the type of movement of the person by referring to the determination table (step S807, select function under condition 1). If the distance to the closest person is greater than or equal to 3 m and less than 5 m (example of second threshold) (NO in step S806, YES in step S808), the control unit 11 selects a function whose predetermined priority is the highest from among functions associated with the types of the detected movement (step S809, select function under condition 2). If the distance to the closest person is greater than or equal to 5 m and less than 10 m (example of third threshold) (NO in step S808, YES in step S810), the control unit 11 selects a function associated with a type of movement of the largest number of the detected persons among the types of the detected movement (step S811, select function under condition 3). If the distance to the closest person is greater than or equal to 10 m (NO in step S810), the control unit 11 selects a function associated with the type of movement of the person by referring to the determination table (step S812, select function under condition 1).

When a function is selected through the above process, the control unit 11 starts the ad hoc mode by decreasing the radio intensity to predetermined intensity (step S813). Subsequently, the control unit 11 determines whether the ad hoc mode is to end (step S814). If a notification about the end of communication has been transmitted from the terminal 2, the control unit 11 determines that the ad hoc mode is to end (YES in step S814) and ends the ad hoc mode (step S815), and the process returns to step S801.

If the number of the detected persons is one (NO in step S803), or if the other wireless communication apparatuses 1 have not detected movement of two persons or more (NO in step S804), the ad hoc mode is started by using a function selected in accordance with the type of movement (step S816) in substantially the same manner as in the fourth or fifth exemplary embodiment.

Modifications

FIGS. 15A to 15D-2 illustrate display examples of the terminal 2. In these examples, the control unit 11 controls the transmission unit such that an identifier is presented in a different manner on the terminal 2 by changing the representation of the identifier displayed on the terminal 2 (example of transmission controller).

FIG. 15A illustrates an example in which the background of "Wireless A" is colored. The control unit 11 transmits a beacon including information indicating the color of the background of the identifier, and the terminal 2 displays the color of the background in accordance with the information.

FIGS. 15B-1 and 15B-2 illustrate examples in which "Wireless A" blinks. The control unit 11 alternately transmits a beacon including the identifier and a beacon not including the identifier each for a predetermined period. Alternatively, the period in which a beacon including the identifier is transmitted and the period in which a beacon is not transmitted may be repeated.

FIG. 15C illustrates an example in which "Wireless A" is replaced with "Wireless A This". The control unit 11 transmits a beacon including "Wireless A This" instead of "Wireless A".

FIG. 15D-2 illustrates an example in which "Wireless A" is displayed at a different position. The control unit 11 transmits a beacon including information indicating the coordinates at which the identifier is to be displayed, and the terminal 2 displays the identifier at the position according to the information. "Wireless A" is displayed at a position illustrated in FIG. 15D-1 before the position is changed; "Wireless A" is displayed at a position illustrated in FIG. 15D-2 after the position has been changed.

Although examples in which the identifier is displayed in different manners have been described above as methods for presenting the identifier in different manners, a voice representing the identifier may be output.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A wireless communication apparatus comprising:
   a transmission unit that transmits an identifier of a network to which the wireless communication apparatus belongs, without designating a destination;
   a transmission controller configured to:
      determine a type of movement of a person detected around the wireless communication apparatus;
      if the type of the movement of the person is a predetermined movement of a plurality of predetermined types of movement, control the transmission unit such that the identifier is presented in a different manner on a terminal that has received the identifier;
   an acceptance unit that accepts a connection request using the identifier from the terminal; and
   a selection unit that, if the type of the detected movement of the person is any one of the plurality of predetermined types of movement, selects any one of a plurality of functions of the wireless communication apparatus in accordance with the type of the movement of the person,
   wherein, if movement of two persons or more has been detected, the selection unit selects a function associated with a type of movement of a person who is closest to the wireless communication apparatus.

2. The wireless communication apparatus according to claim 1, further comprising:
   a notification unit that notifies another wireless communication apparatus of a distance between the person and the wireless communication apparatus; and
   an acquisition unit that acquires a distance between the person and the other wireless communication apparatus,
   wherein the transmission controller controls the transmission unit such that the identifier is presented in a different manner on the terminal if the distance between the person and the wireless communication apparatus is smaller than the distance between the person and the other wireless communication apparatus.

3. The wireless communication apparatus according to claim 1, wherein the transmission controller controls the transmission unit such that the identifier is presented in a different manner by changing representation of the identifier displayed on the terminal.

4. The wireless communication apparatus according to claim 2, wherein the transmission controller controls the transmission unit such that the identifier is presented in a different manner by changing representation of the identifier displayed on the terminal.

5. The wireless communication apparatus according to claim 1, wherein the transmission controller controls the transmission unit such that the identifier is presented in a different manner by changing a state from a state in which the identifier is not displayed to a state in which the identifier is displayed.

6. The wireless communication apparatus according to claim 2, wherein the transmission controller controls the transmission unit such that the identifier is presented in a different manner by changing a state from a state in which the identifier is not displayed to a state in which the identifier is displayed.

7. The wireless communication apparatus according to claim 1,
   wherein the transmission controller controls the transmission unit such that the identifier is presented in a different manner by transmitting the identifier in accordance with the selected function.

8. The wireless communication apparatus according to claim 7, wherein, if movement of two persons or more and a plurality of types of movement have been detected, the selection unit selects a function whose predetermined priority is highest from among functions associated with the respective plurality of types of movement.

9. The wireless communication apparatus according to claim 7, wherein, if movement of three persons or more and a plurality of types of movement have been detected, the selection unit selects a function associated with a type of movement of a largest number of persons detected among the plurality of types of movement.

10. The wireless communication apparatus according to claim 7, wherein, if movement of two persons or more has been detected by the wireless communication apparatus and another wireless communication apparatus and a distance to a person who is closest to the wireless communication apparatus is less than or equal to a threshold, the selection unit selects a function associated with a type of movement of the person.

11. The wireless communication apparatus according to claim 7, wherein, if movement of two persons or more has been detected by the wireless communication apparatus and another wireless communication apparatus, the selection unit selects a function in accordance with a procedure corresponding to a distance to a person who is closest to the wireless communication apparatus, from among a plurality of predetermined procedures.

12. The wireless communication apparatus according to claim 11, wherein the selection unit selects a function under a different condition in accordance with the distance to the person who is closest to the wireless communication apparatus.

13. The wireless communication apparatus according to claim 12, wherein, if the distance to the person who is closest to the wireless communication apparatus is less than a first threshold, the selection unit selects a function associated with a type of movement of the person who is closest to the wireless communication apparatus.

14. The wireless communication apparatus according to claim 13, wherein, if the distance to the person who is closest to the wireless communication apparatus is greater than or equal to the first threshold and less than a second threshold, the selection unit selects a function whose predetermined priority is highest from among functions associated with types of the detected movement.

15. The wireless communication apparatus according to claim 14, wherein, if the distance to the person who is closest to the wireless communication apparatus is greater than or equal to the second threshold and less than a third threshold, the selection unit selects a function associated with a type of movement of a largest number of persons detected among types of the detected movement.

16. The wireless communication apparatus according to claim 10, wherein the transmission controller decreases a radio intensity after the selection unit has selected a function.

17. The wireless communication apparatus according to claim 7, further comprising:
 a request unit that transmits a connection request to another wireless communication apparatus by using an identifier received from the other wireless communication apparatus,
 wherein the selection unit selects either a first function or a second function, the first function being a function for causing the acceptance unit to be operated and not causing the request unit to be operated, the second function being a function for causing the request unit to be operated and not causing the acceptance unit to be operated.

* * * * *